T. LOCKETT.
Sausage Machine.

No. 6,422. Patented May 8, 1849.

UNITED STATES PATENT OFFICE.

THOMAS LOCKETT, OF SHOALS OF OGEECHEE, GEORGIA.

IMPROVEMENT IN SAUSAGE-MACHINES.

Specification forming part of Letters Patent No. 6,422, dated May 8, 1849.

*To all whom it may concern:*

Be it known that I, THOMAS LOCKETT, of Shoals of Ogeechee, in the county of Warren and State of Georgia, have invented a certain new and Improved Machine for Grinding Meat and Stuffing Sausages, of which the following is a full and exact description, reference being had to the annexed drawings of the same, making part of this specification, in which—

Figure 1:
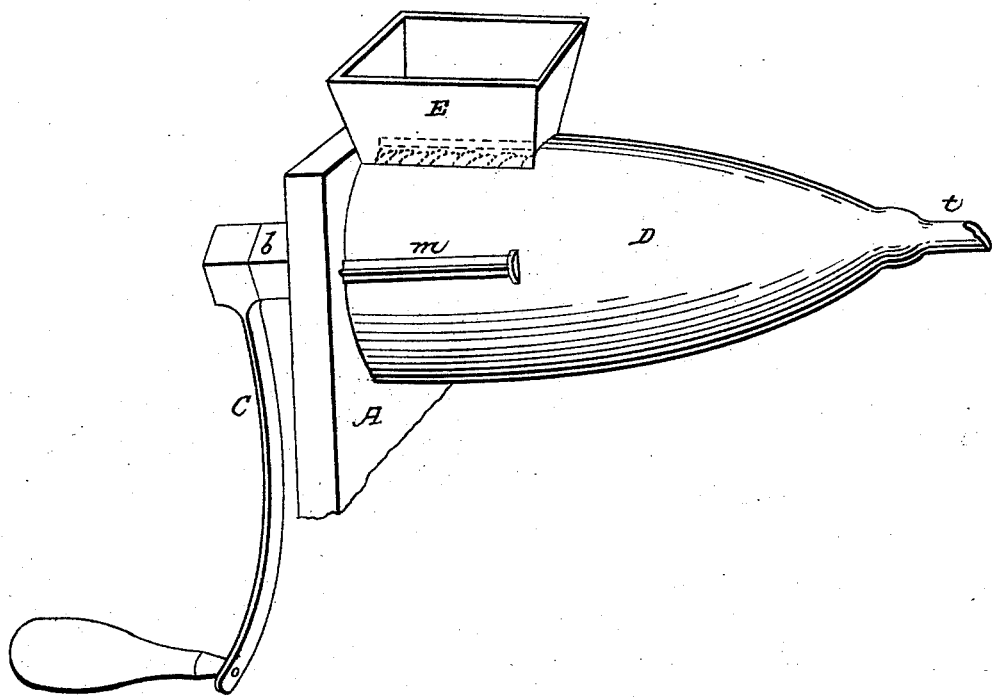
Figure 2:
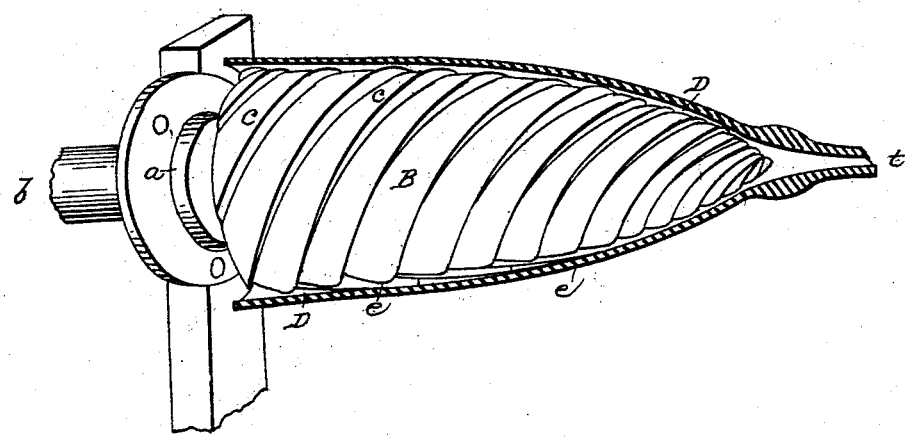

Figure 1 is a perspective view of the exterior of the machine ready for operation, and Fig. 2 is a view of the same with a portion of the exterior removed to expose the internal parts.

The same letters refer to the same parts in both figures.

The nature of my invention and improvement consists in constructing a hollow conoid having a tube or nozzle on its apex and a solid conoid which is made to turn within the same, by the action of which the meat is minced or ground and the sausage stuffed at one operation.

In the accompanying drawings, the standard A is secured to a firm bench or other convenient and suitable place. At a convenient height a pipe-box $a$ is let into it and well secured by screws or wedges. This box is for the purpose of receiving and supporting the axis $b$ of the conoid B. The outer end of the axis $b$ is suitably formed to receive the eye of the crank C, by which it is turned. The conoid B is cast with spiral ribs or cutting-edges $c$ upon its surface, which act in the manner of screws to force the meat toward its apex at the same time that they grind or mince it. Over and around the revolving solid conoid B a hollow fixed conoid D is placed, whose inner periphery has teeth $e$ formed upon it, which are nearly in contact with the teeth $c$ of the revolving conoid. On the apex of the hollow conoid a hollow tube $t$ is affixed, which communicates with the interior, and through which the minced meat is forced by the screwing action of the revolving conoid in a continued column into the gut or other receptacle placed upon the end of the tube $t$ to receive it. The end of this tube is beveled off on one side for the greater convenience of inserting the finger or thumb into the end of the gut to draw the same thereon. On the upper side of the hollow conoid an aperture is formed to receive the meat from the hopper E, which is secured above it to the standard A, to which the hollow conoid is also secured by screw-bolts $m$. One side of the hollow conoid has a recess formed in it adjacent to the aperture beneath the hopper, which is for the purpose of facilitating the passage of the lumps of meat in between the grinding-surfaces.

The conoids, and, indeed, every part of the machine, I prefer to make of cast-iron, because of its durability and cheapness.

The operations consist in drawing the prepared gut over the end of the nozzle or tube $t$. Then filling the hopper with coarse lumps of meat, the operator lays hold of the crank, and, turning it in a contrary direction from that in which the teeth wind round the cone, the meat is drawn in between the inner and outer conoids, and after being ground to the required fineness is pushed with great force through the nozzle in a compact continuous column into the gut placed to receive it, thus performing by a single manipulation both the operations of grinding the meat and stuffing the sausages.

What I claim in the foregoing as my invention, and desire to secure by Letters Patent, is—

The nozzle for stuffing the sausages, in combination with the hollow and solid conoids for grinding or mincing the meat, whether the same are arranged as herein described or in any other substantially similar manner, by which the processes of stuffing and grinding can be simultaneously performed at one operation.

In testimony whereof I have hereunto set my hand this the 7th day of November, A. D. 1848.

THOMAS LOCKETT.

In presence of—
WILLIAM F. BRINKLEY,
WILLIAM G. SCRUGGS.